(12) United States Patent
Simpson

(10) Patent No.: US 11,759,821 B1
(45) Date of Patent: Sep. 19, 2023

(54) WATERPROOFING 3D PRINTED MESHES

(71) Applicant: Waymo LLC, Mountain View, CA (US)

(72) Inventor: John Simpson, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 317 days.

(21) Appl. No.: 16/898,482

(22) Filed: Jun. 11, 2020

(51) Int. Cl.
| | |
|---|---|
| *B33Y 80/00* | (2015.01) |
| *B05D 7/24* | (2006.01) |
| *B05D 3/04* | (2006.01) |
| *B33Y 40/20* | (2020.01) |

(52) U.S. Cl.
CPC ... *B05D 7/24* (2013.01); *B05D 3/04* (2013.01); *B33Y 40/20* (2020.01); *B33Y 80/00* (2014.12); *Y10T 428/12479* (2015.01)

(58) Field of Classification Search
CPC .............................................. Y10T 428/12479
See application file for complete search history.

(56) References Cited

U.S. PATENT DOCUMENTS

| | | | |
|---|---|---|---|
| 8,047,235 B2 | 11/2011 | Lyons et al. | |
| 10,011,800 B2 | 7/2018 | Aizenberg et al. | |
| 10,322,544 B1 | 6/2019 | Simpson | |
| 10,398,041 B2 | 8/2019 | Wu et al. | |
| 2007/0259156 A1 | 11/2007 | Kempers et al. | |
| 2010/0021745 A1* | 1/2010 | Simpson et al. | C09C 1/3081 427/195 |
| 2013/0145572 A1* | 6/2013 | Schregardus et al. | A47L 11/4044 15/322 |
| 2016/0169864 A1 | 6/2016 | Grinstaff et al. | |
| 2017/0080422 A1* | 3/2017 | Maaskant et al. | B04B 13/00 |
| 2018/0120278 A1 | 5/2018 | Hoorfar et al. | |
| 2019/0008219 A1 | 1/2019 | Davidovits | |
| 2019/0337861 A1 | 11/2019 | Luthe et al. | |
| 2020/0016829 A1 | 1/2020 | Ameloot et al. | |

FOREIGN PATENT DOCUMENTS

| | | |
|---|---|---|
| CN | 107418872 A | 12/2017 |
| CN | 108372305 B | 7/2019 |
| CN | 108746621 B | 10/2019 |
| DE | 102016012746 A1 | 4/2018 |

OTHER PUBLICATIONS

Aggarwal et al., "Novel 3D printing filament composite using diatomaceous earth and polylactic acid for materials properties and cost improvement", Composites Part B: Engineering, Nov. 2019.
Oliveira et al., "Superhydrophobic Surfaces Engineered Using Diatomaceous Earth", American Chemical Society, May 2013.

\* cited by examiner

*Primary Examiner* — Adam Krupicka
(74) *Attorney, Agent, or Firm* — McDonnell Boehnen Hulbert & Berghoff LLP

(57) ABSTRACT

Porous solid members are provided that include, disposed on at least a portion of the internal surfaces of a plurality of channels thereof, a plurality of superhydrophobic particles. These particles inhibit ingress of water or other aqueous fluids into the internal spaces of the porous solid member, reducing the occurrence of corrosion, biological growth, or other unwanted effects of fluids present in the internal spaces. The porous solid member could be fabricated using 3D printing methods, e.g., the member could be a 3D printed aluminum or other metal(s). The plurality of superhydrophobic particles can be disposed on the internal surfaces of the channels within the porous solid member via a number of processes, e.g., by delivering the particles into the channels while disposed in a payload fluid that later evaporates.

20 Claims, 4 Drawing Sheets

WATERPROOFING 3D PRINTED MESHES

BACKGROUND

Three-dimensional printing (3D printing) allows for a variety of structures to be fabricated in low quantities and with relatively short turnaround. Additionally, 3D printing can facilitate the fabrication of structures that would be difficult or impossible to construct via other methods, e.g., via casting, negative manufacturing techniques, etc. Such structures may include complicated internal structures (e.g., curving, branching, or other varieties of internal channels or voids) that may be completely enclosed from the external environment of the formed object, separate element formed within closed or otherwise difficult-to-access internal volumes of an enclosing element, or other features making fabrication of the object via traditional methods of fabrication (e.g., investment casting) difficult or impossible. Further, fine-grained control over additive 3D printing processes can allow the material composition of the printed object to vary in a controlled manner, e.g., by varying a type of filament or resin used, by varying a speed, heat or other deposition property of a filament-based printing process, by varying an exposure parameter, layer thickness, or other property of a resin-exposure-based printing process, by varying a degree of infill, or by varying some other property of the 3D printing process from location to location within the printed object.

SUMMARY

Some embodiments of the present disclosure provide an apparatus including: (i) a porous solid member having a plurality of internal channels that are in communication with an external surface of the porous solid member, wherein the plurality of internal channels define a plurality of internal surfaces of the porous solid member, and wherein at least one channel of the plurality of internal channels extends from a first external location of the porous solid member to a second external location of the porous solid member; and (ii) a plurality of superhydrophobic particles disposed on at least a portion of the internal surfaces of the porous solid member.

Some embodiments of the present disclosure provide a method including: (i) obtaining a porous solid member having a plurality of internal channels that are in communication with an external surface of the porous solid member, wherein the plurality of internal channels define a plurality of internal surfaces of the porous solid member; (ii) disposing a payload fluid into at least a portion of the plurality of internal channels, wherein the payload fluid includes a carrier fluid and a plurality of superhydrophobic particles; and (iii) evaporating the carrier fluid from within the internal channels such that the plurality of superhydrophobic particles are disposed on at least a portion of the internal surfaces of the porous solid member.

Some embodiments of the present disclosure provide an apparatus including: (i) a porous solid member having a plurality of internal channels that are in communication with an external surface of the porous solid member, wherein the plurality of internal channels define a plurality of internal surfaces of the porous solid member, and wherein a portion of at least one channel of the plurality of internal channels is located not less than five millimeters from an external surface of the porous solid member; and (ii) a plurality of superhydrophobic particles disposed on at least a portion of the internal surfaces of the porous solid member.

These as well as other aspects, advantages, and alternatives, will become apparent to those of ordinary skill in the art by reading the following detailed description, with reference where appropriate to the accompanying drawings.

DETAILED DESCRIPTION

Figure 1A:
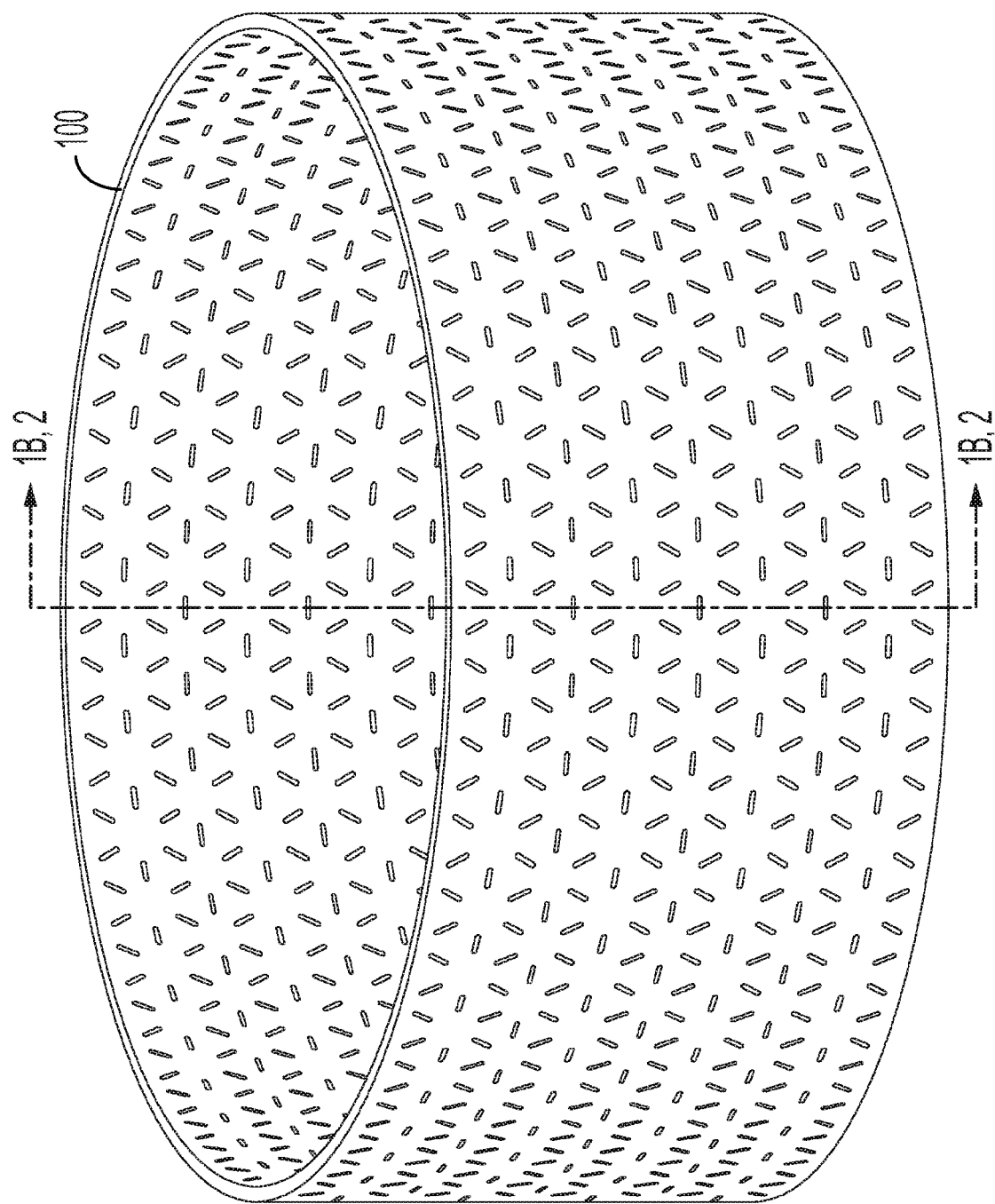
FIG. 1A illustrates, in perspective view, an example porous solid member.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

I. Overview

Objects manufactured via 3D printing can often be improved by printing the objects to include a plurality of internal voids or channels, which may be interconnected. The presence of these voids can reduce the weight of the formed object while maintaining or even increasing its strength. The presence of the voids can also reduce the cost of the part by reducing the amount of feedstock required and/or by reducing the time needed to print the part. However, voids and channels provide additional internal surface area and volume where unwanted materials (e.g., seawater, biological materials) can accumulate and/or where corrosion or other undesired processes may occur, weakening the structure or resulting in other unwanted effects (e.g., increased mass, generation of hazardous biological substances). This can be an especially pressing issue when the part is 3D printed from metal (e.g., an aluminum part generated through selective laser melting, direct metal laser sintering, or some other process for 3D printing metals). While such channels or voids can be sealed from the environment (e.g., by forming a part to have a closed external surface that fully encloses the internal volume of the part), liquids or other unwanted materials may still enter the internal volumes via cracks, gas or liquid diffusion through the material, or via other processes.

One solution is to dispose superhydrophobic particles on the internal surfaces of such a 3D printed object. The superhydrophobicity, geometry, size, and density of the particles disposed on the internal surfaces can be specified such that water or other aqueous solutions of concern are unable to enter the channels or other internal volumes under normal operating conditions (e.g., when the effective pressure, viscosity, minimum droplet size, or other properties of the fluid are within specified ranges). Accordingly, the exposure of the internal surfaces to the fluid may be reduced or eliminated entirely, reducing corrosion, deposition of biological matter or other material or fluids, or other unwanted processes occurring in the internal surfaces or volumes of the part.

Whole and/or crushed shells of diatoms that have been chemically rendered hydrophobic are an example of such superhydrophobic particles. This may be related to their many pores and other nano-scale features resulting in a high surface area to volume ratio for the shells and/or for fragments thereof. The whole and/or fragmented diatom shells may be sourced as diatomaceous earth.

Whole and/or fragmented diatom shells, particles of fumed silica, particles of aerogel, or other suitable superhydrophobic particles may be disposed on internal surfaces of a part in a variety of ways. They may be adhered to the internal surfaces by polyurethane or some other adhesive or binding agent. They may be adhered to the internal surfaces by Van der Waals forces or other adsorptive processes. They may be partially embedded within the material that forms the internal surfaces, e.g., by being transported into the internal volumes of the part by a solvent that acts to partially dissolve the material. Before the solvent evaporates, it can partially dissolve the material, allowing the particles to be partially embedded in the material once the material re-solidifies following evaporation of the solvent.

It should be understood that the above embodiments, and other embodiments described herein, are provided for explanatory purposes, and are not intended to be limiting.

II. Example Porous Solid Members

A porous solid member as described herein can include a variety of objects that include a plurality of internal channels. Such object can have a variety of shapes, sizes, compositions, mechanical properties (e.g., flexibility in one or more directions), surface coatings or treatments, properties (e.g., number, shape, size, and location) of internal channels, or other characteristics according to an application. Such porous solid members could include internal channels for a variety of reasons, e.g., to reduce weight, to reduce cost (e.g., of 3D printer stock or other material to form the member, to reduce the time required for a 3D printer to create the member), to increase and/or control the flexibility of the member, to increase the strength and/or strength-to-weight ratio of the member, to provide buoyancy, to provide volume for storage of fluids within the member, to allow for passage of fluids through the member (e.g., to allow for drainage of water through the channels, to duct and/or direct air through the channels and/or to control the drag or other aerodynamic properties of the member and/or to facilitate dissipation of heat from the member), or to provide some other benefit(s).

Such a porous solid member may be produced via a variety of processes and/or combinations of processes, including but not limited to casting, subtractive manufacturing methods, assembly from a plurality of parts (e.g., a plurality of shaped sheets of material, adhered together via adhesive, welding, or some other means), or 3D printing or some other additive manufacturing technique. 3D printing includes a variety of processes, including vat photopolymerization, material jetting, binder jetting, powder bed fusion, material extrusion, directed energy deposition, and sheet lamination. The type of 3D printing process used may be related to the type of material used, e.g., selective laser melting or direct metal laser sintering could be used to 3D print metals while via fused filament fabrication or stereolithography could be used to 3D print polymers.

The use of 3D printing to generate the porous solid member can allow for the member to have a structure that would be difficult or impossible to construct via other methods, e.g., via casting, negative manufacturing techniques, etc. For example, a porous solid member formed via 3D printing can include complicated curving, branching, or otherwise complex internal channels or voids. These channels may be completely enclosed from the external environment of the formed solid member or may have one or more ends open to an external environment at one or more respective locations of an external surface of the porous solid member. For example, a particular internal channel of a porous solid member may have a first end located at a first external location of the member and a second end located at a second external location of the member. One or both of the ends of the channel may be open to an external environment of the porous solid member. In some examples, the channels could extend deeply into the volume of the porous solid member. For example, a particular channel could extend at least a specified distance (e.g., 5 mm, 10 mm) from any external surface of the member, or could extend from an external surface location of the member by a distance that is greater than a specified fraction (e.g., 20%, 25%, 30%, 40%, 50%) of a characteristic dimension (e.g., thickness) of the porous solid member at the specified location.

The presence of such channels within a porous solid member can provide a variety of benefits, including but not limited to those described above and elsewhere herein. However, fluid or other materials can enter the channels, leading to a variety of unwanted effects. For example, where the porous solid member is composed of metal, such internal channels may provide considerable internal surface area that can experience corrosion or other unwanted chemical reaction(s) in response to the presence of water (e.g., saltwater) or other fluids. The presence of water or other materials (e.g., dirt) can provide a substrate for the growth of plants, mold, or other biological organisms. This can lead to the generation of unwanted biological products (e.g., odors, toxins, spores) and/or damage to the structure of the porous solid member (e.g., due to expansion of the organism(s) in the channels as they grow, or due to the creation of corrosive, solvent, or otherwise damaging chemical or biological substances). Ingress of water or other fluids into the internal channels can increase the weight, density, moment of inertia, and/or other mechanical properties of the porous solid member.

One solution to this problem is to ensure that the internal channels are not exposed to the external environment of the solid member. This could include forming the member to block or cover openings between the channels and the external environment and/or applying a covering or coating to close off the ends of the channels from the external environment. However, the benefits of such a solution may be reduced or lost entirely by the formation of cracks or other damaging processes occurring in the porous solid member, exposing the internal surfaces of the internal channels to water or other environmental contaminants. Alternatively, water and/or water vapor may penetrate the material of the porous solid member, resulting in the presence of water in the internal channels. Further, a variety of applications may benefit from the internal channels being exposed to the environment (e.g., to permit flow of air through the channels to control an aerodynamic property of the member and/or to facilitate heat management, to allow for pressure within the channels to equalize with the environment in response to changes in temperature and/or pressure) and/or may require the internal channels to be exposed to the environment.

To inhibit water or other fluids from entering and/or wetting internal surfaces of internal channels of a porous solid member, a superhydrophobic coating can be disposed on the internal surfaces of the porous solid member (e.g., on the internal surfaces of the plurality of internal channels of the porous solid member). For example a plurality of particles of superhydrophobic diatomaceous earth (SHDE) or other superhydrophobic particles (e.g., particles of fumed silica and/or an aerogel) could be adhered to or otherwise disposed on the internal surfaces of the internal channels of the porous solid member and/or on external surfaces of the solid porous member. These superhydrophobic particles can inhibit wetting of the surfaces of the solid porous member, thereby reducing corrosion or other unwanted effects of wetting of the internal surfaces of the porous solid member. In some examples, the properties of the superhydrophobic particles (e.g., a density, an effective contact angle of a surface on which the particles are disposed) and a diameter or other characteristic dimension of the channels could be specified to completely prevent ingress of water or other aqueous fluids into the channels from the environment of the porous solid member under specified conditions (e.g., when the real or effective pressure of the external fluid on the external channel openings is less than a specified pressure, when the fluid is applied as a non-turbulent bulk and/or as droplets greater than a specified size and/or less than a specified velocity relative to the channel openings).

Figure 1B:
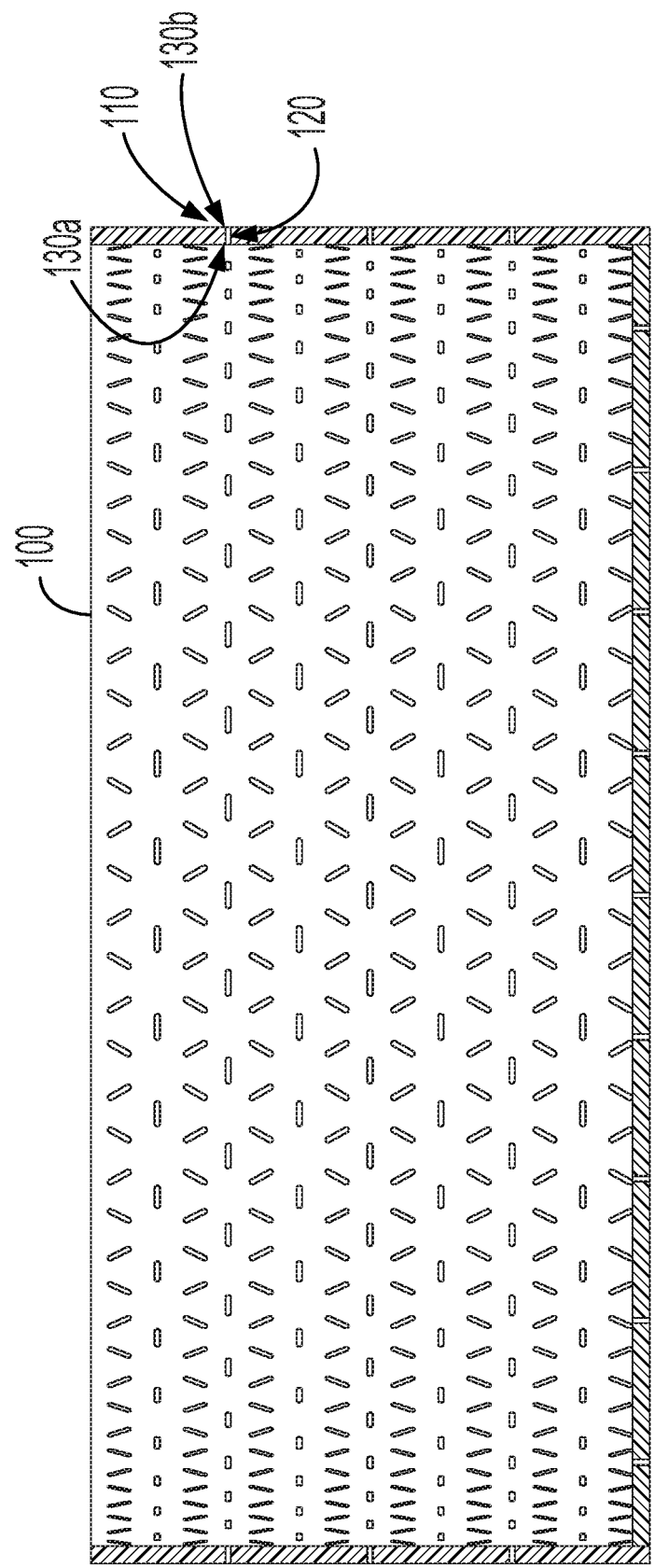
FIG. 1B illustrates, in cross-section view, the example porous solid member of FIG. 1A.

FIGS. 1A and 1B illustrate, in perspective and cross-sectional view, respectively, an example porous solid member 100 as described herein. The porous solid member 100 has an overall shape of a cylinder that is covered at one end and open at the other. The porous solid member 100 includes a plurality of internal channels (including example channel 110). Each of the channels is in communication with the external surface of the member 100. The plurality of channels define a plurality of internal surfaces of the member 100. To illustrate this, example channel 110 defines an internal surface 120 of the member 100. The example channel 110 is in communication with the external surface of the member 100 at two locations, extending from a first end of the channel 110 at a first external location 130a to second end of the channel 110 at a second external location 130b. A plurality of superhydrophobic particles (e.g., particles of SHDE) are disposed on the internal surfaces of the channels (e.g., on the internal surface 120 defined by the example channel 110), rendering those surfaces effectively superhydrophobic. Such particles may also be disposed on external surface of a porous solid member as described herein, e.g., to provide additional corrosion resistance or other benefits.

Figure 2:
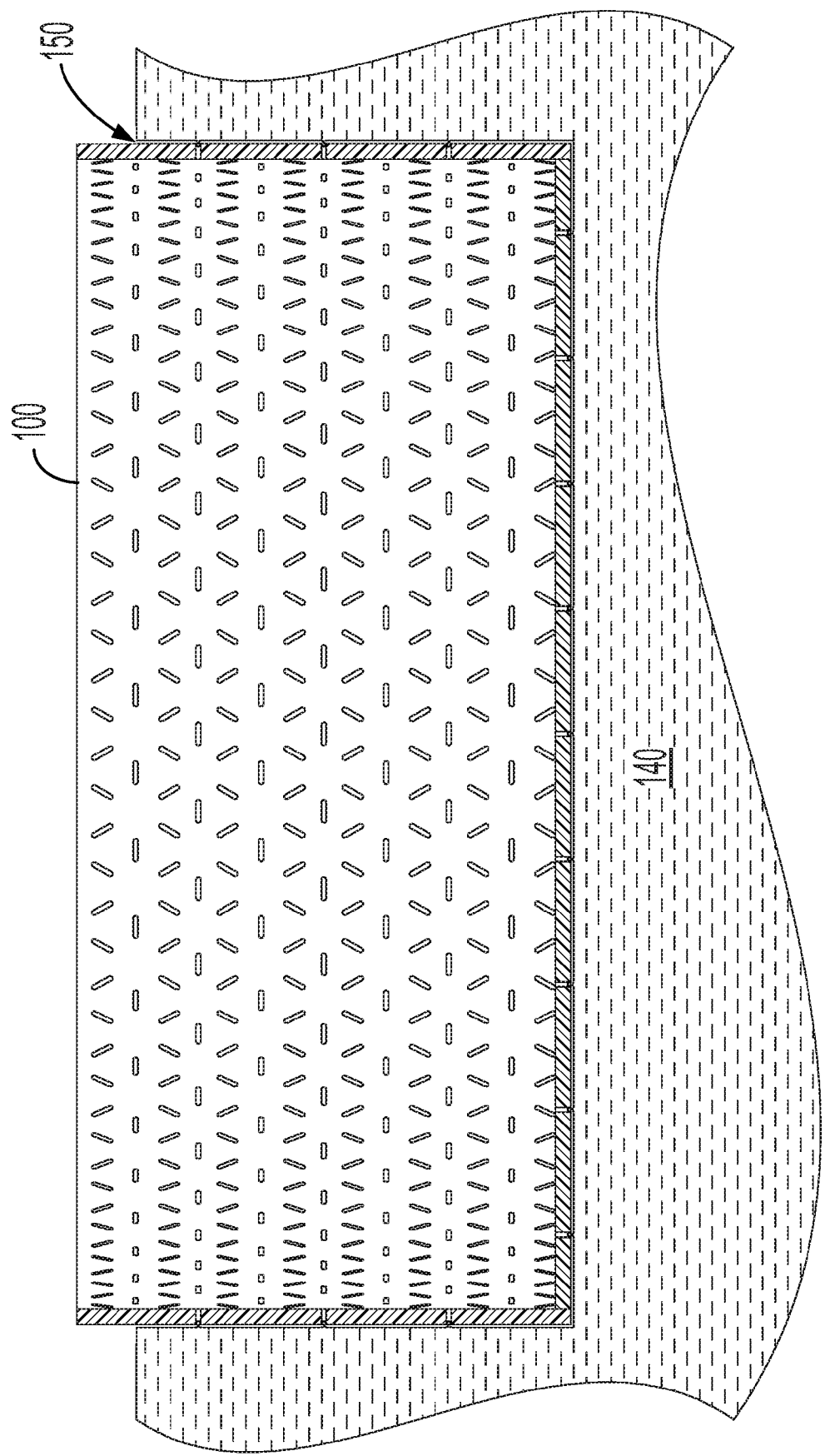
FIG. 2 illustrates, in cross-section, the example porous solid member of FIG. 1A.

As noted elsewhere herein, the properties of the channels and of the plurality of superhydrophobic particles disposed therein can be specified such that, under specified conditions, water or other aqueous fluids is inhibited from entering the channels. This is illustrated in FIG. 2, which shows the porous solid member 100 floating in a volume of water 140 or some other aqueous fluid. The properties of the porous solid member 100 (e.g., the diameter and shape of the internal channels thereof) and of the plurality of superhydrophobic particles disposed on internal surfaces thereof (e.g., the density, size, shape, contact angle, or other properties of the individual particles and/or of their disposal within the channels) is such that the water 140 is excluded from all but the outer portions of the internal channels. The superhydrophobic particles are also disposed on the external surfaces of the member 100, resulting in a thin layer of air 150 being trapped between the water 140 and the external surfaces of the member 100.

Each of the channels of the porous solid member 100 illustrated in FIGS. 1A and 1B is a straight, slot-shaped, non-branching channel having two ends that are open to the environment of the porous solid member 100 and that extend between different external locations of the porous solid member 100. This is intended as a non-limiting example embodiment, and an internal channel of a porous solid member as described herein could have a variety of similar or different configurations. As used herein, an "internal channel" of a porous solid member is any elongate void within the solid material of the porous solid member. Such an internal channel may be open to the environment of the porous solid member at one or both ends located at one or two external locations of the porous solid member, or such a channel may be closed at both ends. Where the porous solid member includes a branching network of internal channels, a particular internal channel may have certain portions in common with other internal channels, e.g., a particular substantially cylindrical void within the solid material of the porous solid member may be a part of two or more internal channels of the porous solid member. An "external surface" of a porous solid member is any surface of the porous solid member that is exposed to the external environment of the porous solid member directly rather than by way of portions of one or more internal channels of the porous solid member.

The internal channels of the porous solid member could extend deeply into the volume of the porous solid member, e.g., to allow the density, weight, and/or cost of the porous solid member to be reduced. This could include the internal channels occupying more than a specified percent of the effective volume of the porous solid member (i.e., the volume that is contained within the external surfaces of the porous solid member). For example, the internal channels could have a volume that is greater than 80%, 70%, 60%, 50%, 40%, or 30% of the effective volume of the porous solid member.

The internal channels of such a porous solid member, extending throughout the effective volume of the member, could be characterized as extending from an external surface of the porous solid member to locations that are, in some manner, deep within the effective volume of the porous solid member. For example, a particular internal channel could extend from a first end that is located at an external surface of the porous solid member to a location that is more than a specified distance from the external surface of the porous solid member, e.g., to a location that is not less than 5 millimeters, 10 millimeters, 15 millimeters, or some other specified distance from any external surface of the porous solid member. Additionally or alternatively, a particular channel could extend from a first end that is located at an external surface of the porous solid member to a location that is more than a specified multiple of a characteristic cross-sectional dimension (e.g., diameter) of the internal channel from the external surface of the porous solid member, e.g., to a location that is not less than 10, 20, 30, 40, or 50 times a diameter or other characteristic cross-sectional dimension of the channel from any external surface of the porous solid member. In some examples, the depth of the internal channel could be characterized as a portion of the dimension of the porous solid member and/or a local segment thereof. For example, a particular channel could extend from a first end that is located at an external surface of the porous solid member to a location that is not less than 10%, 20%, 30%, or 40% of a thickness or other characteristic cross-sectional dimension of the porous solid member or a portion thereof (e.g., a wall of the porous solid member).

The internal and/or external surfaces of a porous solid member as described herein can be made hydrophobic by disposing on those surfaces a plurality of superhydrophobic particles (e.g., particles of whole or fragmented diatom shells of SHDE, particles of fumed silica, or particles of an aerogel). Such particles could be composed of intrinsically hydrophobic or superhydrophobic materials, or could be processed to render external surfaces of the particles hydrophobic or superhydrophobic. This could include chemical processes (e.g., by exposing the silane shells of diatoms to fluoro-chloro-silane) or other processes. For example, the particles could be formed to have a micro- or nano-structure of pores, spikes, or other features to increase the effective hydrophobicity of the particles.

In an example, the superhydrophobic particles could be whole or fragmented particles of SHDE (e.g., SHDE containing Celtix diatom shells). Such particles could be the result of exposing whole or fragmented diatom shells to fluoro-chloro-silane or some other process to render the whole or fragmented diatom shells superhydrophobic. The diatom shells could be exposed to grinding or some other process to fragment the shells, reducing their size (e.g., to fragments having characteristic sizes less than one micron) while preserving their hydrophobic character. This size reduction can facilitate disposing the fragmented shells on the internal surfaces of a porous solid member or provide other benefits.

The superhydrophobic particles could be adhered to or otherwise disposed on the internal surfaces of a porous solid member via a variety of mechanisms. In some examples, the particles could be adhered to the internal surfaces of the member by Van der Waals forces or other mechanisms of adhesion. In some examples, adhesion of the particles to the internal surfaces could be facilitated by exposing the internal surfaces to a surface treatment, e.g., to render the internal surfaces more hydrophobic. Additionally or alternatively, a binding agent (e.g., polyurethane) could be used to adhere the particles to the internal surfaces. In some examples, the particles could be partially embedded in the internal surfaces. This could be effected by, e.g., delivering the particles into internal channels of a porous solid member as part of a payload fluid that also includes a solvent capable of dissolving the material of the porous solid member. For example, the porous solid member could be composed of an acetone-soluble polymer, and the payload fluid could include acetone. Non-particulate elements of the payload fluid could then be evaporated from inside the internal channels in a manner that results in the internal surfaces being partially dissolved, allowing the particles to be partially embedded in the internal surfaces after evaporation of the solvent.

III. Example Methods

Figure 3:
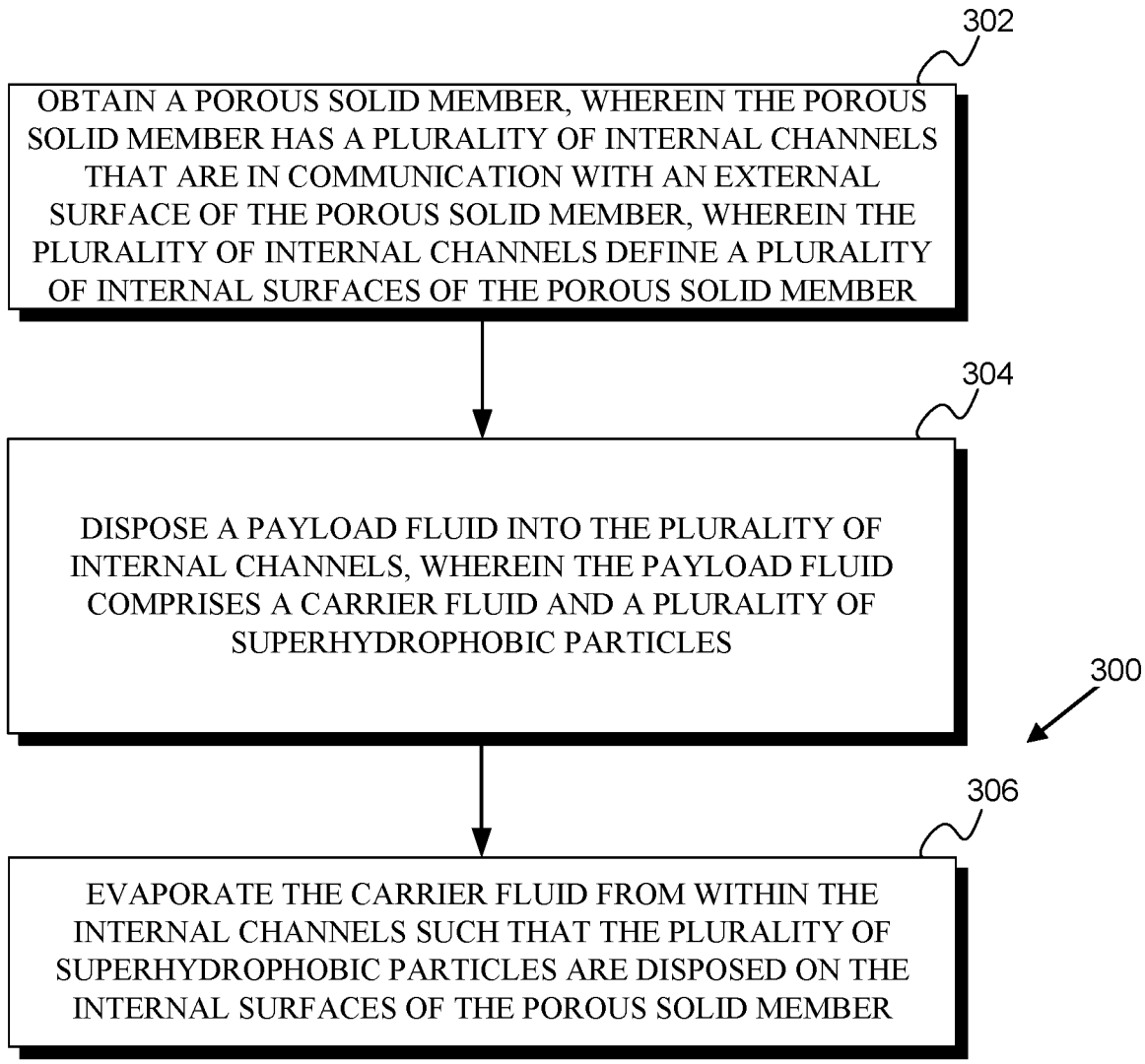
FIG. 3 is a flowchart of an example method.

FIG. 3 is a flowchart of an example method 300 for disposing a plurality of superhydrophobic particles on the internal surfaces of a porous solid member. The method 300 includes obtaining the porous solid member, wherein the porous solid member has a plurality of internal channels that are in communication with an external surface of the porous solid member, wherein the plurality of internal channels define a plurality of internal surfaces of the porous solid member (302). This could include using 3D printing to generate the porous solid member, e.g., using additive or subtractive 3d Printing processes. The material of such a 3D printed porous solid member could be metal (e.g., formed via selective laser melting, direct metal laser sintering, or some other process for 3D printing metals), a polymer (e.g., formed via fused filament fabrication, stereolithography, or some other process for 3D printing polymers), or some other 3D printed material. Additionally or alternatively, the porous solid member could be fabricated using a 3D printed object, e.g., via investment casting, sand casting, or some other method of object fabrication using reusable or wholly sacrificial 3D printed mold or other 3D printed object.

The method 300 further includes disposing a payload fluid into the plurality of internal channels, wherein the payload fluid comprises a carrier fluid and a plurality of superhydrophobic particles (304). The payload fluid could be introduced into the plurality of internal channels via a variety of methods. For example, the porous solid member could be submerged in a bath of the payload fluid. Jets of payload fluid could be directed at the porous solid member. Ultrasonic emitters or other means could be used to agitate the payload fluid and/or the porous solid member. High or low pressure could be applied to remove any remnant air or other environmental gases from within the channels.

The payload fluid includes the plurality of superhydrophobic particles and a carrier fluid. The carrier fluid could include water, isopropyl alcohol, other alcohols, surfactants, and/or other chemicals to facilitate delivery of the particles into the internal channels of the porous solid member and/or to facilitate the subsequent evaporation of the carrier fluid from within the internal channels. For example, the carrier fluid could include water and a surfactant (e.g., isopropyl alcohol or some other solvent) to facilitate wetting of the superhydrophobic particles by the water. The payload fluid could include a binding agent or other substance to facilitate adhesion of the particles to internal surfaces of the internal channels. For example, the payload fluid could include polyurethane or some other binding agent. Additionally or alternatively, the payload fluid could include a solvent to facilitate partial dissolution of the material of the internal surfaces of the porous solid member, so as to result in partial embedding of the particles within the internal surfaces following evaporation of the solvent, carrier fluid, and/or other elements of the payload fluid.

The payload fluid could include some or all of these elements in a variety of proportions. In some example embodiments, a payload fluid could include 10-20 percent by weight binding agent (e.g., polyurethane), 10-20 percent by weight solvent (e.g., acetone), 45-55 percent by weight alcohol (e.g. isopropyl alcohol), 5-15 percent by weight water, and 5-15 percent by weight superhydrophobic particles (e.g., particles of SHDE, particles of fumed silica and/or aerogel). For example, the payload fluid could include 15 percent by weight polyurethane, 15 percent by weight acetone, 50 percent by weight isopropyl alcohol, 10 percent by weight water, and 10 percent by weight superhydrophobic particles. The superhydrophobic particles could be all the same type of particles, or could be a mixture of types of particles. For example, the particles in a payload fluid could be 90 percent by weight SHDE particles and 10 percent by weight particles of fumed silica.

The method 300 further includes evaporating the carrier fluid from within the internal channels such that the plurality of superhydrophobic particles are disposed on the internal surfaces of the porous solid member (306). This could include exposing the porous solid member, with the payload fluid disposed therein, to a specified temperature, humidity, and/or pressure for a specified period of time and/or exposing the porous solid member to an environment that corresponds to a specified time-varying profile with respect to temperature, humidity, and/or pressure. Evaporating the carrier fluid from within the internal channels could include exposing the porous solid member to ambient conditions (e.g., "room temperature") for a specified period of time. The timing and conditions used to evaporate the carrier fluid from within the porous solid member could be specified in order to facilitate partial embedding of the particles into the internal surfaces of the porous solid member by, e.g., allowing a solvent in the payload sufficient time to partially dissolve the material of the internal surfaces (such that the particles can become partially embedded therein) while not resulting in excessive dissolution of the material and/or deformation or destruction of the porous solid member.

The method 300 could include other additional steps or elements. For example, the method 300 could include one or more finishing steps to cure a binding agent within the porous solid member. In another example, heat could be applied to anneal the porous solid member.

IV. Conclusion

The particular arrangements shown in the Figures should not be viewed as limiting. It should be understood that other embodiments may include more or less of each element shown in a given Figure. Further, some of the illustrated elements may be combined or omitted. Yet further, an exemplary embodiment may include elements that are not illustrated in the Figures.

Additionally, while various aspects and embodiments have been disclosed herein, other aspects and embodiments will be apparent to those skilled in the art. The various aspects and embodiments disclosed herein are included for purposes of illustration and are not intended to be limiting, with the true scope and spirit being indicated by the following claims. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

What is claimed is:

1. An apparatus comprising:
    a porous solid member, wherein the porous solid member has a plurality of internal channels that are in communication with an external surface of the porous solid member, wherein the plurality of internal channels define a plurality of internal surfaces of the porous solid member, and wherein at least one channel of the plurality of internal channels extends from a first external location of the porous solid member to a second external location of the porous solid member; and
    a plurality of superhydrophobic particles disposed on at least a portion of the internal surfaces of the porous solid member and on at least a portion of the external surface of the porous solid member.

2. The apparatus of claim 1, wherein the plurality of superhydrophobic particles comprise particles of superhydrophobic diatomaceous earth.

3. The apparatus of claim 1, wherein the porous solid member is formed by three-dimensional printing.

4. The apparatus of claim 1, further comprising a binding agent, wherein at least a portion of the plurality of superhydrophobic particles are adhered to at least a portion of the internal surfaces of the porous solid member by the binding agent.

5. The apparatus of claim 4, wherein the binding agent comprises polyurethane.

6. The apparatus of claim 1, wherein at least a portion of the plurality of superhydrophobic particles are adhered to at least a portion of the internal surfaces of the porous solid member by Van der Waals forces.

7. The apparatus of claim 1, wherein at least a portion of the plurality of superhydrophobic particles are adhered to at least a portion of the internal surfaces of the porous solid member by being partially embedded in a material of the porous solid member.

8. The apparatus of claim 1, wherein the material of the porous solid member comprises a metal.

9. The apparatus of claim 1, wherein the plurality of superhydrophobic particles comprise particles of fumed silica.

10. The apparatus of claim 1, wherein the plurality of superhydrophobic particles comprise particles of aerogel.

11. An apparatus comprising:
    a porous solid member, wherein the porous solid member has a plurality of internal channels that are in communication with an external surface of the porous solid member, wherein the plurality of internal channels define a plurality of internal surfaces of the porous solid member, and wherein a portion of at least one channel of the plurality of internal channels is located not less than five millimeters from an external surface of the porous solid member; and
    a plurality of superhydrophobic particles disposed on at least a portion of the internal surfaces of the porous solid member and on at least a portion of the external surface of the porous solid member.

12. The apparatus of claim 11, wherein the plurality of superhydrophobic particles comprise particles of superhydrophobic diatomaceous earth.

13. The apparatus of claim 11, wherein the porous solid member is formed by three-dimensional printing.

14. The apparatus of claim 11, further comprising a binding agent, wherein at least a portion of the plurality of superhydrophobic particles are adhered to at least a portion of the internal surfaces of the porous solid member by the binding agent.

15. The apparatus of claim 14, wherein the binding agent comprises polyurethane.

16. The apparatus of claim 11, wherein at least a portion of the plurality of superhydrophobic particles are adhered to at least a portion of the internal surfaces of the porous solid member by Van der Waals forces.

17. The apparatus of claim 11, wherein the material of the porous solid member comprises a metal.

18. The apparatus of claim 11, wherein the plurality of superhydrophobic particles comprise particles of fumed silica.

19. The apparatus of claim 11, wherein the plurality of superhydrophobic particles comprise particles of aerogel.

20. The apparatus of claim 11, wherein at least a portion of the plurality of superhydrophobic particles are adhered to at least a portion of the internal surfaces of the porous solid member by being partially embedded in a material of the porous solid member.

* * * * *